INVENTOR
PAUL EARL
BY
Shoemaker and Mattare
ATTORNEYS

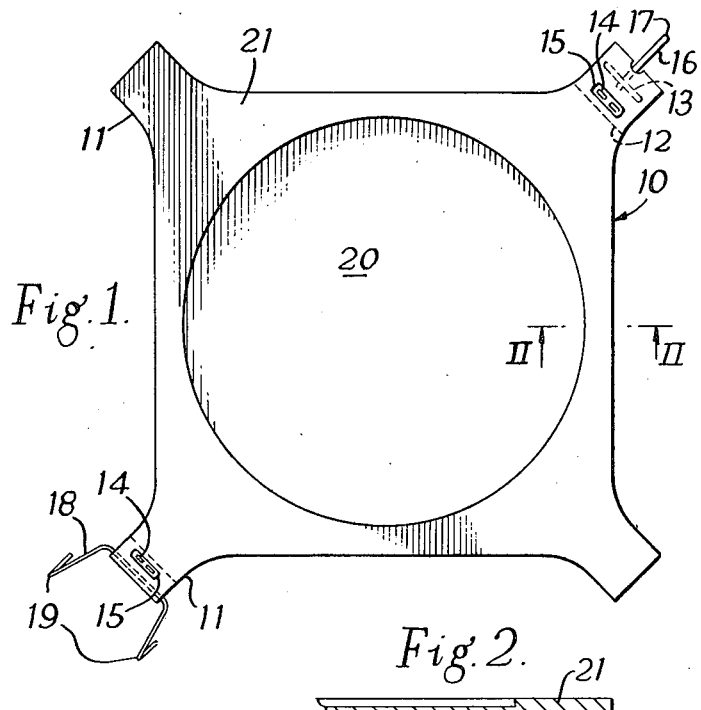
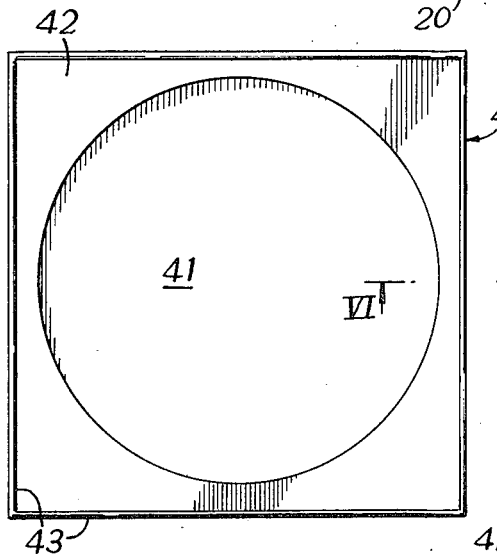

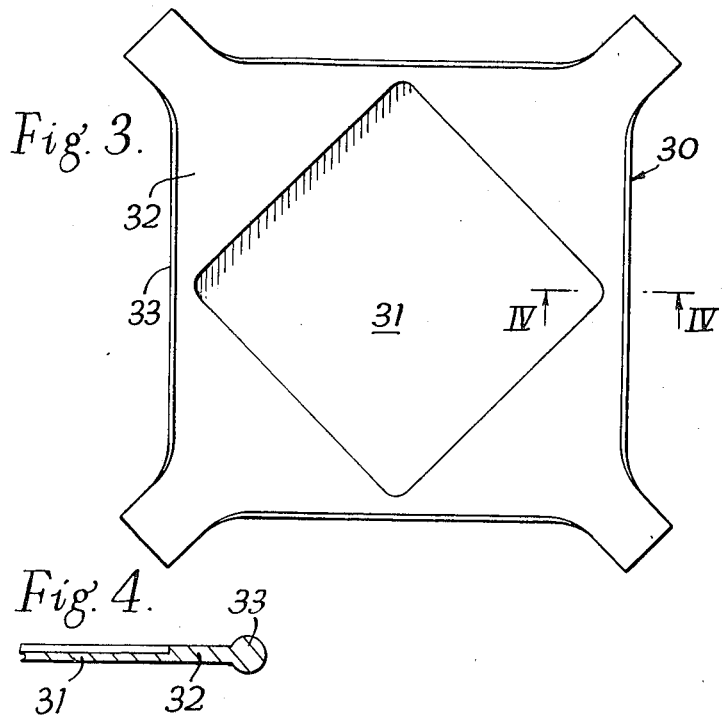
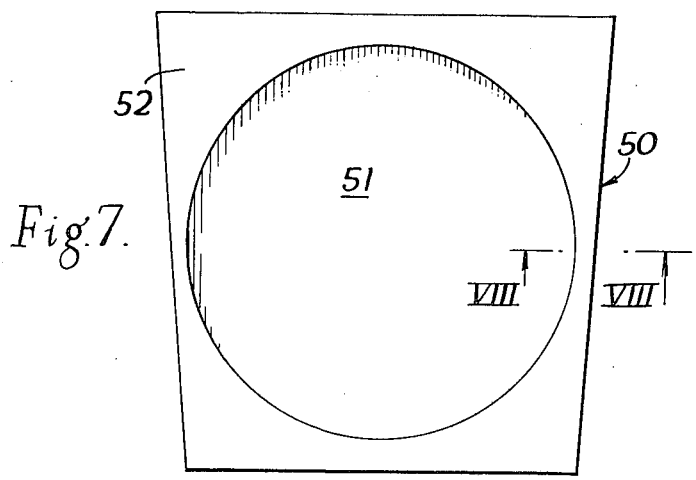
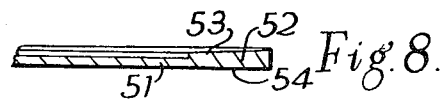
INVENTOR
PAUL EARL
BY
Shoemaker and Mattare
ATTORNEYS Nov. 16, 1965     P. EARL     3,217,786
UPHOLSTERY SUPPORTS
Filed Sept. 13, 1963     4 Sheets-Sheet 3
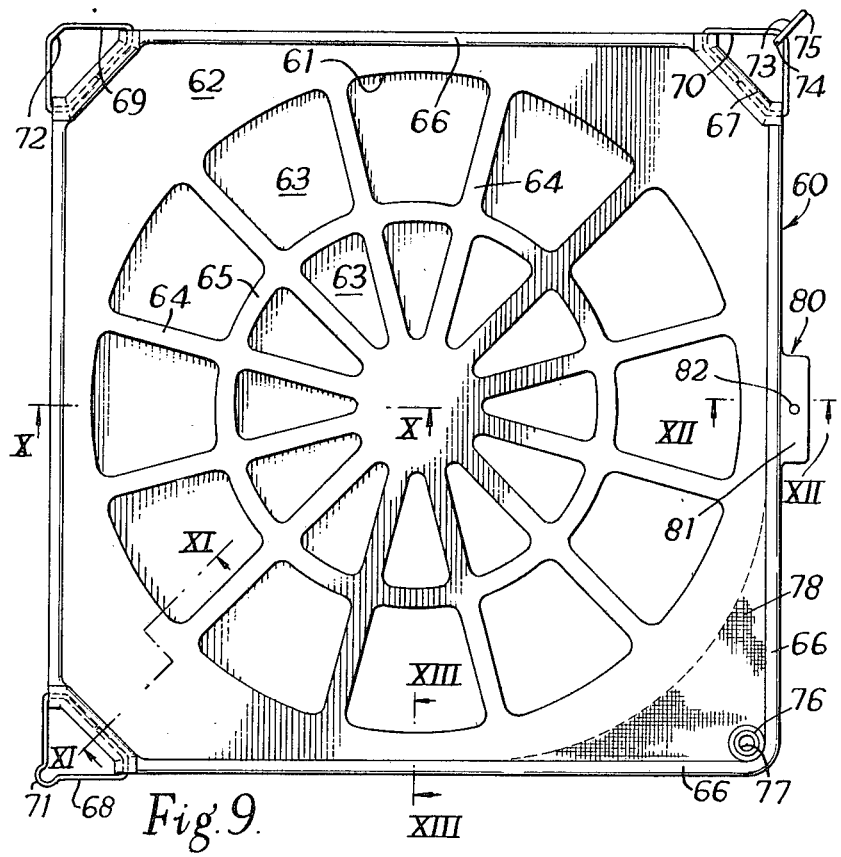
Fig. 9.
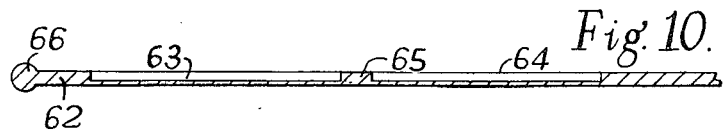
Fig. 10.
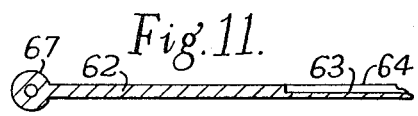
Fig. 11.
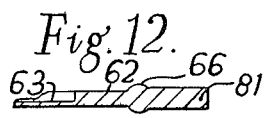
Fig. 12.
Fig. 13.
INVENTOR
PAUL EARL
BY
Shoemaker and Mattare
ATTORNEYS Nov. 16, 1965　　　　　　　　P. EARL　　　　　　　3,217,786
UPHOLSTERY SUPPORTS
Filed Sept. 13, 1963　　　　　　　　　　　　　　4 Sheets-Sheet 4

United States Patent Office 3,217,786
Patented Nov. 16, 1965

3,217,786
UPHOLSTERY SUPPORTS
Paul Earl, Ilford, England, assignor, by mesne assignments, to Pirelli Limited, a limited-liability company of Great Britain
Filed Sept. 13, 1963, Ser. No. 308,876
Claims priority, application Great Britain, Sept. 18, 1962, 35,548/62
2 Claims. (Cl. 160—404)

The present invention relates to upholstery supports.

The primary object of the present invention is to provide a resilient support of an elastomeric material for use in the furniture industry, but which may also be used in the automobile industry, particularly in connection with front bucket seats of automobiles.

The present invention will now be described with reference to the accompanying drawings in which:

FIGURE 1 is a plan view of one form of support in accordance with the present invention;

FIGURE 2 is a section taken on the line II—II in FIGURE 1;

FIGURE 3 is a plan view of an alternative form of the present invention;

FIGURE 4 is a section on the line IV—IV in FIGURE 3;

FIGURE 5 is another alternative form of support in accordance with the invention;

FIGURE 6 is a section on the line VI—VI in FIGURE 5;

FIGURE 7 is another alternative form of support in accordance with the invention;

FIGURE 8 is a section on the line VIII—VIII of FIGURE 7;

FIGURE 9 is a plan view of a composite support in accordance with the present invention, different parts of the view showing different modifications as hereinafter explained;

FIGURE 10 is a section on the line X—X in FIGURE 9.

FIGURE 11 is a section taken on the line XI—XI in FIGURE 9;

FIGURE 12 is a section taken on the line XII—XII in FIGURE 9;

FIGURE 13 is a section taken on the line XIII—XIII in FIGURE 9;

Figure 14:
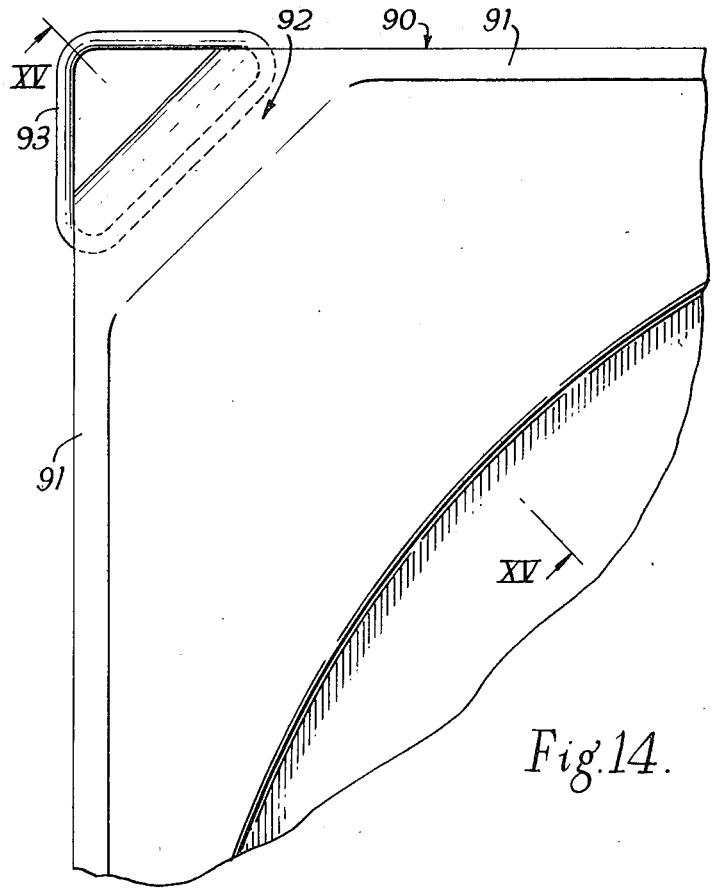
FIGURE 14 is a plan view of one corner of the support in accordance with the present invention.

Referring now to the drawings, FIGURE 1 illustrates an upholstery support 10, which is generally rectangular in shape, having at the corners of the rectangle portions 11 which constitute extensions of the diagonals of the rectangle. The right hand top portion 11 is shown as having been folded back on itself so that the free end 12 lies underneath, being folded about a support arm 13 and thereafter secured in position by means of a staple 14 in conjunction with a pair of apertured metal plates 15 of which only one is visible in FIGURE 1. The support arm is secured at its mid-point to a member 16 which at one end is bent around the arm 13 and at the other end 17 is bent so as to form a hook-like end. The assembly, consisting of the arm 13 and the member 16 will hereinafter be referred to as a suspension element.

In the left hand bottom corner, there is illustrated an alternative method of providing the support of FIGURE 1 with a suspension element. The portion 11 is again folded back on itself around the central portion of a piece of stout wire 18 which is bent at 19 so as to form two spaced hook-like elements. The free end of the portion 11 is held in this position by means of the same staple and plates combination 14, 15, already referred to.

It will be noted from FIGURES 1 and 2 that the support consists of a centrally located portion 20 and a peripheral portion 21, said two portions being integral with one another. Portion 20 is circular in configuration and has a thickness less than that of the peripheral portion.

The portion 11 has formed therein an aperture 22 through which the shank of the member 16 extends.

Referring to FIGURES 3 and 4, there is illustrated a support 30 having a centrally located portion 31 and a peripheral portion 32, said portions being integral with one another. The portion 31 is square as also is the general configuration of the whole support, the portion 31 having been turned through 90° with respect to the support, so that the sides of the portion 31 make an angle of approximately 45° with those of the support.

The edge portions 33 of the peripheral portion 32 are formed in the manner of beads, having a thickness considerably greater than that of the portion 31 and greater than that of the peripheral portion 32.

Referring to FIGURES 5 and 6, a support 40 consists of a centrally located portion 41 of generally circular configuration and a peripheral portion 42 which is bounded by edge portions 43 formed in the manner of beads. The thickness of the beads is considerably greater than that of the portion 41 and greater than that of the portion 42.

Referring to FIGURES 7 and 8, a support 50 consists of a generally circular centrally located portion 51 and a peripheral portion 52, the sides of which are disposed at an angle less or greater than 90° with respect to one another. It will be seen from FIGURE 8 that the peripheral portion is not supplemented by the formation of beads as in the embodiment shown in FIGURES 3 to 6 but nevertheless, the support is provided with a thickened edge portion having faces 53, 54, which are not parallel to one another, the face 53 sloping inwardly from a portion of greater thickness to one of less thickness in the direction of the centrally located portion 51.

Referring now to FIGURES 9 to 13, there is illustrated in FIGURE 9 a support 60, which consist of a centrally located portion 61 of generally circular configuration and a peripheral portion 62, said portions being integral with one another. The portion 61 actually illustrated is formed from very thin membranes 63 which are separated from one another by radial ribs 64 and a concentric ring 65, thereby forming a so-called "Gothic tracery."

The edge portions of the peripheral portion 62 are formed in the manner of beads 66, the ends of each bead 66 being connected to one end of an anchor portion 67, the anchor portions each being located at a corner of the square support. Associated with each anchor portion is a suspension element, hereinafter more fully described. As an alternative to the above arrangement, the beads 66 of two sides which are disposed at right angles to one another, may merely be run into one another as shown at the bottom right hand corner of FIGURE 9, thereby omitting the anchor portions 67.

In those constructions of support which employ anchor portions, a suspension element is moulded in during vulcanisation or cure of the elastomeric material in a mould. FIGURE 9 illustrates three different types of suspension elements 68, 69, 70. The suspension element 68 is generally of triangular configuration with a loop portion 71 at the apex of the triangle, said loop portion being provided for the purpose of enabling the suspension element to locate itself properly upon a hook (not illustrated) provided on the leg of a wooden chair. The suspension element 69 is basically the same as the element 68 except that a straight portion 72 is substituted for the loop portion 71 of the element 68. The suspension element 70 is again generally triangular and is associated with a hook element 73 which is bent at 74 to engage the element 70 and also at 75 to engage an eye (not illustrated) fixed to the leg of a wooden chair.

The suspension element illustrated in the bottom right hand corner of FIGURE 9 consists of an eyelet 76 similar to those which are used in the manufacture of tents, said eyelet being formed with an aperture 77 extending right through the body of the support in that region. Said region is reinforced with a textile material which is indicated by the reference numeral 78. This material may be of any type and may either be bonded to the elastomeric material or merely embedded therein.

The support of FIGURE 9 may either have four fixing points located at the corners, or it may be provided with two or more additional fixing points of which one is indicated generally by the reference numeral 80. Said fixing point 80 may consist of a lug portion 81 made solely of elastomeric material, or perhaps reinforced by a metallic insertion, the purpose of which would be to prevent a hook on the chair in engagement with the aperture 82 tearing through the elastomeric material when a load is applied to the support.

It will be noted from the section FIGURES 10–13 that in all cases the bead 66 has a thickness greater than that of the peripheral portion 62, which in turn has a thickness greatly in excess of that of the membranes 63. The radial ribs 64 and the concentric ring 65 each have a thickness as shown, equal or substantially equal to that of the peripheral portion 62.

Figure 15:
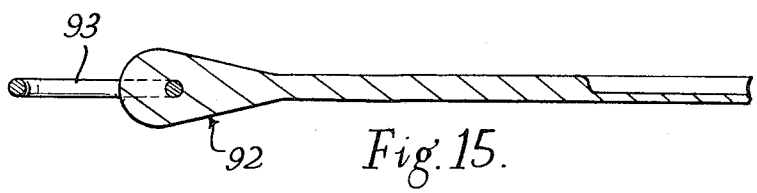
FIGURE 15 is a section taken on the line XV—XV in FIGURE 14.

Referring now to FIGURES 14 and 15, there is illustrated a corner of a support member 90 in which beads 91 merge into a built-up corner indicated by the reference numeral 92 in FIGURE 14, said built-up corner being best seen in FIGURE 15. A suspension element 93 is moulded into the built-up corner 92 as before.

It will be appreciated that the supports shown in FIGURES 5 to 8 will have to be completely by the addition thereto of suspension elements which would take one of the forms illustrated in FIGURES 9 to 15, and it will further be appreciated that the support illustrated in FIGURES 3 and 4 would also have to be completed by the addition at each corner of a suspension element similar to either one of the suspension elements shown in FIGURE 1.

It will be obvious to a person skilled in the art that where the suspension element takes the form of a hook (17 and 19 in FIGURE 1 and 75 in FIGURE 9), these suspension elements will engage either the eye attached to a wooden or other chair frame or with a hole drilled in the tubular metal frame of, for example, an automobile seat.

The various edge portions formed in the manner of beads in FIGURES 3 to 15 are provided in order to prevent or substantially reduce the tendency of the support, when secured to a framework under tension, to stretch in such a manner that the straight sides of the support become bowed inwardly towards the centre of the centrally located portion. The manner in which the edge portions are thus reinforced and the extent to which they are reinforced, will obviously vary in dependence upon the load which is known to be applied to the support, and therefore, the drawings are not to be regarded as regards scale, to be indicative of the relative thickness of the various portions.

It has been found that good results are obtained if the generally circular centrally located portion occupies from 60% to 65% of the area of the whole support, and that the generally square centrally located portion of FIGURES 3 and 4 occupies from 35% to 45% of the total area of the support.

What I claim as my invention and desire to secure by Letters Patent of the United States is:

1. A resilient upholstery support of an elastomeric material including integral centrally located and peripheral portions defining a one-piece construction, said peripheral portion having a substantially constant thickness throughout, the outer edges of said peripheral portion having a substantially greater thickness than said peripheral portion to define a bead extending completely around said peripheral portion, said support comprising a substantially flat sheet in its free form with one side thereof substantially planar, the other side thereof having formed within the central portion thereof at least one depression defining a substantial area of the central portion which is of substantially less thickness than said peripheral portion, said centrally located portion having an area which is at least one-third and no more than two-thirds of the area of said support and said centrally located portion being imperforate, and suspension means separate from and secured to spaced portions of said peripheral portion, each of said suspension means including a part which is molded within said elastomeric material of the support.

2. A resilient upholstery support of an elastomeric material including integral centrally located and peripheral portions; straight edge portions defining the boundaries of said support and also defining a generally four-sided figure; the thickness of the elastomeric material in said edge portions being greater than that in said peripheral portion to define a bead extending around said peripheral portion; said centrally located portion being generally circular in configuration and consisting of membranes and thickened portions; the thickness of the elastomeric material in said thickened portions being less than that in said edge portions and the thickness of the elastomeric material in said membrances being considerably less than that of any other portion of said support; and means facilitating the suspension of said support under tension, said means facilitating suspension of the support consisting of reinforcing material and an eyelet, said reinforcing material being textile in character and connected to said elastomeric material and said eyelet extending through the connected elastomeric and reinforcing materials.

References Cited by the Examiner

UNITED STATES PATENTS

| 1,938,635 | 12/1933 | North | 160—387 X |
|---|---|---|---|
| 1,987,921 | 1/1935 | Bertsch | 160—378 |
| 2,163,359 | 6/1939 | Van Derveer | 160—404 X |
| 2,488,728 | 11/1949 | Kopplin | 160—371 |
| 2,532,713 | 12/1950 | Gottfried | 160—388 |
| 2,645,540 | 7/1953 | Trimble | 160—378 |
| 2,826,245 | 3/1958 | Sellner | 160—404 |
| 3,088,559 | 5/1963 | Farnsworth et al. | 160—399 |

FOREIGN PATENTS

| 845,516 | 8/1960 | Great Britain. |
|---|---|---|

HARRISON R. MOSELEY, *Primary Examiner.*